United States Patent [19]

Brink et al.

[11] Patent Number: 5,965,648

[45] Date of Patent: *Oct. 12, 1999

[54] POLY(ALKYLENE ETHER)S AS PLASTICIZERS AND FLOW AIDS IN POLY (1,4-CYCLOHEXANEDIMETHYLENE TEREPHTHALATE) RESINS

[75] Inventors: Andrew Edwin Brink; Sam Richard Turner; Gerald Timothy Keep, all of Kingsport, Tenn.

[73] Assignee: Eastman Chemical Company, Kingsport, Tenn.

[ * ] Notice: This patent is subject to a terminal disclaimer.

[21] Appl. No.: 08/803,560

[22] Filed: Feb. 20, 1997

Related U.S. Application Data

[63] Continuation of application No. 08/528,971, Sep. 15, 1995, Pat. No. 5,624,987.

[51] Int. Cl.$^6$ .............................. C08K 5/10; C08K 5/05; C08K 5/06

[52] U.S. Cl. ................... 524/290; 524/308; 524/376; 524/377; 524/378

[58] Field of Search ................... 524/290, 308, 524/376, 377, 378

[56] References Cited

U.S. PATENT DOCUMENTS

| | | | |
|---|---|---|---|
| 3,355,413 | 11/1967 | Kiefer | 260/31.4 |
| 3,435,093 | 3/1969 | Cope | 260/857 |
| 3,763,109 | 10/1973 | Witsiepe | 260/75 |
| 3,856,749 | 12/1974 | Hoeschele | 260/45.9 |
| 4,435,546 | 3/1984 | Bier et al. | 525/418 |
| 4,438,233 | 3/1984 | Lee | 524/299 |
| 4,541,884 | 9/1985 | Cogswell et al. | 156/166 |
| 4,548,978 | 10/1985 | Garrison, Jr. | 524/314 |
| 4,558,085 | 12/1985 | Lee | 524/299 |
| 4,795,771 | 1/1989 | Yoshihara | 524/114 |
| 4,914,145 | 4/1990 | Tohdoh | 524/285 |
| 5,004,817 | 4/1991 | Bastioli et al. | 549/557 |
| 5,028,647 | 7/1991 | Haylock et al. | 524/290 |
| 5,389,710 | 2/1995 | Dege et al. | 524/243 |
| 5,451,626 | 9/1995 | Kumaki et al. | 524/378 |
| 5,624,987 | 4/1997 | Brink et al. | 524/290 |
| 5,700,857 | 12/1997 | Mukohyama | 524/290 |

FOREIGN PATENT DOCUMENTS

| | | | |
|---|---|---|---|
| 0 331 085 | 9/1989 | European Pat. Off. | C07C 65/21 |
| 1 389 301 | 2/1965 | France . | |
| 16 94 202 | 4/1971 | Germany . | |
| 1256562 | 10/1989 | Japan | C08L 67/02 |
| 1 217 423 | 12/1970 | United Kingdom . | |

OTHER PUBLICATIONS

W. K. Witsiepe, *Adv. Chem. Ser.*, No. 129, 1973, pp. 39–60.
E. A. Flexman, *Adv. Chem. Ser.*, No. 233, "Toughened Plastics I", 1993, pp. 79–104.

*Primary Examiner*—Veronica P. Hoke
*Attorney, Agent, or Firm*—Betty J. Boshears; Harry J. Gwinnell

[57] ABSTRACT

This invention relates to a polyester composition comprising a blend of:

(A) 99.5 to 75 weight % of a copolyester having an inherent viscosity of 0.1 to 1.2 dL/g and having a melting point in excess of 250° C., comprising:
  (a) one or more dicarboxylic acids, and
  (b) a glycol component comprising at least 80 mole % 1,4-cyclohexanedimethanol; and (B) 0.5 to 25 weight % of one or more polyalkylene ethers, wherein the weight percentages of all components in said blend total 100 weight %.

32 Claims, No Drawings

POLY(ALKYLENE ETHER)S AS PLASTICIZERS AND FLOW AIDS IN POLY (1,4-CYCLOHEXANEDIMETHYLENE TEREPHTHALATE) RESINS

This is a continuation application under 37 CFR 1.60 of prior application Ser. No. 08/528,971 filed on Sep. 15, 1995, of Andrew Edwin Brink, Sam Richard Turner and Gerald Timothy Keep for "POLYALKYLENE ETHER AS PLASTICIZERS AND FLOW AIDS IN POLY(1,4-CYCLOHEXANEDIMETHYLENE TEREPHTHALATE) RESINS" now U.S. Pat. No. 5,624,987.

FIELD OF THE INVENTION

This invention concerns blends of a poly(1,4-cyclohexanedimethylene terephthalate) (PCT) resin with one or more polyalkylene ethers.

BACKGROUND OF THE INVENTION

Melt viscosity and crystallization rate as a function of temperature are often critical to the process of injection molding semicrystalline engineering thermoplastics.

The melt viscosity is critical in that it governs the mold fill of the part (lower melt viscosity leads to faster mold fill and the ability to fill smaller parts) and therefore it is desirable to minimize this important parameter.

The crystallization rate as a function of temperature is critical in that it controls the optimum mold temperature and cycle time of the process. It is desirable to operate at mold temperatures of less than 110° C. since this allows for the use of traditional water heated, as opposed to oil heated molds. It is also economically desirable to operate at such a temperature as to allow for the optimum crystallization rate as this translates into shorter cycle times.

The use of a plasticizer is generally known for some polyesters to enhance both of these critical parameters. Polyalkylene ethers are known plasticizers for low melting polyesters such as poly(butylene terephthalate) (PBT) and poly(ethylene terephthalate) (PET), but are known to be sensitive to thermal degradation. Polyalkylene ethers are reported to degrade when temperatures exceed 250° C., as stated by W. K. Witsiepe (Adv. Chem. Ser., No. 129, 39–60, 1973). A plasticizer will typically decrease the melt viscosity and depress the glass transition temperature of the thermoplastic which in turn allows for a faster crystallization rate at a lower temperature.

Common plasticizers for polyester engineering plastics are low molecular weight organic esters such as neopentylglycoldibenzoate (Benzoflex S312) and dipropyleneglycoldibenzoate (Benzoflex 9-88).

The use of plasticizers in semicrystalline engineering polymers to improve moldability is well known to the art. Furthermore the need for and use of improved plasticizers for semicrystalline polyesters is well known to the art.

Polyalkyleneethers have been used as plasticizers for low melting polyesters such as PBT and PET, but are known to be sensitive to thermal degradation. In fact, U.S. Pat. No. 4,548,978 to Garrison, Jr., U.S. Pat. No. 5,028,647 to Haylock et al, U.S. Pat. No. 4,914,145 to Tohdon et al, U.S. Pat. No. 4,558,085 to Lee, and U.S. Pat. No. 5,004,817 to Bastioli et al and JP Patent 1,256,562 to Hara et al teach the use of polyalkylene oxides such as polyethylene glycol as plasticizers in polyethylene terephthalate.

However, E. A. Flexman reports in Adv. Chem. Ser., 233(Toughened Plastics I), 79–104, 1993 that many additives utilized to improve the properties of low melting polyesters, such as PBT, are not useful in higher melting polyesters because the significantly higher processing temperatures required degrade the additives.

Polyalkylene ethers degrade when temperatures exceed 250° C., as reported by W. K. Witsiepe (Adv. Chem. Ser., No. 129, 39–60, 1973). In fact, the flash point of polyethylene glycol is reported to be 243° C., attesting to its poor thermal stability. Polytetramethylene glycol, when exposed to high temperatures, undergoes a degradation reaction. Therefore, it would be expected that polyalkylene ethers would not be useful as plasticizers for semicrystalline polymers with melting points in excess of 250° C.

It is reported by Witsiepe (Adv. Chem. Ser., No. 129, 39–60, 1973) that the optimum reaction temperature for polyether esters is 250° C. because above this temperature degradation of the polyalkylene ether occurs.

In U.S. Pat. No. 4,438,233 discloses the practice of "end-capping" the polyalkylene ether to increase the thermal stability so that it can be processed at higher temperatures but not exceeding 200° C.

U.S. Pat. No. 3,763,109 to Witsiepe and U.S. Pat. No. 3,856,749 to Hoeschele both describe methods of stabilizing polyalkylene ethers to high heat aging. These patents teach the necessity of added stabilizers to provide the polyalkylene ethers enough thermal stability to withstand temperatures of up to 170° C.

Furthermore, U.S. Pat. No. 4,541,884 to Cogswell teaches the necessity for the plasticizer to be melt stable at least to the processing temperature of the matrix polymer.

U.S. Pat. No. 5,389,710 is of interest which discloses a polyester composition comprising a polyester such as PCT or PET and an effective amount of a certain type of α, ω-bis(aminoalkyl)-polyoxyalkylene crystallization modifier which is required to chemically react with the PCT or PET composition. These modifiers require an amine group.

SUMMARY OF THE INVENTION

This invention relates to a polyester composition comprising a blend of:
(A) 99.5 to 75 weight % of a copolyester having an inherent viscosity of 0.1 to 1.2 dL/g and having a melting point in excess of 250° C., comprising:
  (a) one or more dicarboxylic acids, and
  (b) a glycol component comprising at least 80 mole % 1,4-cyclohexanedimethanol; and
(B) 0.5 to 25 weight % of one or more polyalkylene ethers,
wherein the weight percentages of all components in the blend total 100 weight %.

The blend of the one or more polyalkylene ethers with the copolyester useful in the invention results in a decrease in melt viscosity and in glass transition temperature of the copolyester. It is unexpected that polyalkylene ethers would cause these results for semicrystalline polymers with melting points in excess of 250° C. such as the copolyesters of the invention.

DETAILED DESCRIPTION OF THE PREFERRED EMBODIMENTS

Poly(1,4-cyclohexanedimethylene terephthalate) (PCT) resins require a significantly higher processing temperature than PET resins and a much higher processing temperature than PBT resins due to its high melting point (295° C.). This high melting point of PCT therefore requires processing temperatures in excess of 300° C. which would be expected to degrade said polyalkylene ethers. However, this invention demonstrates the polyalkylene ethers of the invention decrease the melt viscosity of the polymer matrix and depress the glass transition temperature thus improving the processability of PCT without degrading the mechanical properties.

The addition of such polyalkylene ethers decreases the melt viscosity of the PCT composition alone or when the PCT resin is reinforced with glass fibers. Since the plasticizers depress the glass transition temperature of PCT thus increasing crystallization rate, it also allows for the use of mold temperatures <110° C.

While not being bound by any theory, these observations suggest that, when blended with PCT, the polyalkylene ethers exhibit an unexpected improvement in thermal stability allowing them to survive the high processing temperatures.

More particularly, this invention relates to a polyester composition comprising a blend of:

(A) 99.5 to 75, preferably 99.5 to 85, more preferably, 99 to 90, and even more preferably, 97 to 93 weight % of a copolyester having an inherent viscosity of 0.1 to 1.2 dL/g, and having a melting point in excess of 250° C., comprising:
  (a) one or more dicarboxylic acids, and
  (b) a glycol component comprising at least 80, preferably at least 90, more preferably at least 95 mole % 1,4-cyclohexanedimethanol; and (B) 0.5 to 25 weight % of one or more polyalkylene ethers, wherein the weight percentages of all components in said polyester composition equal 100 weight %.

It is preferable that the dicarboxylic acid component comprise at least 90, preferably 95 mole % terephthalic acid. In this case, it is preferable that the dicarboxylic acid component of the copolyester may comprise repeat units of from 10 mole % or less of one or more other dicarboxylic acids besides terephthalic acid, or suitable synthetic equivalents such as dimethyl terephthalate.

Dicarboxylic acids useful in the dicarboxyic acid component of the invention include, but are not limited to aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms.

Particularly preferred examples of dicarboxylic acids other than terephthalic acid to be used in forming the copolyester of the invention include: isophthalic acid, naphthalene-2,6-dicarboxylic acid, 1,4-cyclohexanedicarboxylic acid, 1,4-cyclohexanediacetic acid, diphenyl-4,4'-dicarboxylic acid, succinic acid, glutaric acid, adipic acid, azelaic acid, sebacic acid, and the like. Of these dicarboxylic acids to be included with terephthalic acid, isophthalic acid is preferred. Copolyesters may be prepared from one or more of the above dicarboxylic acids.

It should be understood that the dicarboxylic acid can arise from the corresponding acid anhydrides, esters, and acid chlorides of these acids.

The glycol component may comprise up to 20 mole %, preferably up to 10 mole %, of one or more other aliphatic or alicyclic glycols.

Such additional diols include cycloaliphatic diols preferably having 6 to 20 carbon atoms or aliphatic diols preferably having 2 to 20 carbon atoms. Examples of such diols are: ethylene glycol, diethylene glycol, triethylene glycol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, decalin diol and 2,2-bis-(4-hydroxypropoxyphenyl)-propane.

Copolyesters may be prepared from two or more of the above diols. Ethylene glycol is a preferred glycol.

The copolyester resins useful in the blend of this invention are well known and are commercially available. Methods for their preparation are described, for example, in U.S. Pat. Nos. 2,465,319 and 3,047,539.

The polyesters of the invention preferably have an inherent viscosity of 0.1 to 1.2 dL/g, more preferably 0.1 to 0.9 dL/g, and even more preferably, 0.4 to 0.8 dL/g.

Copolyesters containing substantially only ethylene glycol, 1,4-cyclohexanedimethanol and terephthalic acid or substantially only ethylene glycol, 1,4-cyclohexanedimethanol, isophthalic and terephthalic acid are preferred.

It is particularly preferred that the copolyester useful herein have a melting point in excess of 250° C., preferably in excess of 260° C.

These polyalkylene glycols can either be end-capped or not. By end-capped, we mean the polymer is preferably end-capped by reacting the terminal hydroxyl groups with epoxy, isocyanate or carboxylic acid compounds.

Preferred polyalkylene ethers contemplated for use in the invention comprise compounds of the formula:

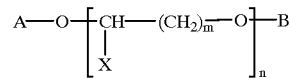

wherein, m is an integer from 1 to 3, inclusive, n is an integer from 4 to 250 inclusive, X is selected from one or more of the group consisting of $CH_3$, $C_3H_7$, $C_2H_5$, and H, A is hydrogen, alkyl, acyl, including aroyl, or aryl of 1 to 10 carbon atoms, and B is hydrogen, alkyl, acyl, including aroyl, or aryl of 1 to 10 carbon atoms.

Preferred polyalkylene ethers for use in the compositions of the present invention are those described above where m is one, or where n is 4 to 14, or where X is H. More preferably, m is one, n is 4 to 14, and X is H.

Even more preferred plasticizers for use in the compositions of the present invention are those described above where m is one, or where n is 7 to 25, or where A is acyl of 8 carbon atoms or methyl, or where B is acyl of 8 carbon atoms, and especially where m is one, n is 7 to 25, X is H, A is acyl of 8 carbon atoms or methyl, and B is acyl of 8 carbon atoms. Polyethylene glycol 400 bis(2-ethylhexanoate), methoxy polyethylene glycol 550 2-ethylhexanoate and tetraethylene glycol bis(2-ethylhexanoate) are especially preferred. Polyethylene glycol 400 bis(2-ethylhexanoate) is even more preferred.

The polyalkylene ethers even more useful in the invention are preferably selected from the group consisting of polyethylene glycol, polytetramethylene glycol, and polypropylene glycol or mixtures thereof.

The actual molecular weight of the poly(alkylene glycol) is not critical, however it is preferred that it be of sufficient molecular weight as to prevent volatilization during compounding. It is preferred that the polyalkylene ethers have a number average molecular weight of from 200 to 10,000, preferably 400 to 1,500.

These polyalkylene glycols can either be end-capped or not. By end-capped, we mean the polymer is preferably end-capped by reacting the terminal hydroxyl groups with epoxy, isocyanate or carboxylic acid compounds.

It is understood that other additives such as stabilizers, flame retardants, tougheners, epoxy compounds, mold release agents, nucleating agents, and colorants might also be desirable in such formulations. Such additives are generally present at 0.1 to about 20 weight % based on the total weight of said polyester composition.

Useful flame retardants, include, but are not limited to, brominated polystyrene combined with sodium antimonate.

Examples of reinforcing agents are glass fibers, carbon fibers, mica, clay, talc, wollastonite, and calcium carbonate. A particularly preferred reinforcing agent is glass fiber. It is preferable that the glass fibers be present in the polyester composition at from 0.1 to 40%, preferably 0.1 to 30%, by weight based on the total weight of said polyester composition.

Glass fibers suitable for use in the polyester compositions of the invention may be in the form of glass filaments, threads, fibers, or whiskers, etc., and may vary in length from about 1/8 inch to about 2 inches. Chopped glass strands having a length of about 1/8 inch to about 1/4 inch are preferred. Such glass fibers are well known in the art. Of course, the size of these glass fibers may be greatly diminished depending on the blending means employed, even to lengths of 300 to 700 microns or lower.

The polyester compositions of the invention may be reinforced with a mixture of glass and other reinforcing agents as described above, such as mica or talc, and/or with other additives.

The polyester compositions of the invention containing reinforcing agents may be molded at mold temperatures below 120° C. and are therefore easily molded without the need for expensive mold heating equipment. The preferred molding temperature of the glass filled polyester compositions of the invention is in the range of 20–110° C.

The components of the blend of the invention may blended and/or mixed by any suitable technology known in the art.

The inherent viscosities (I.V.) of the copolyesters are determined in 60/40 (wt./wt.) phenol/tetrachloroethane at a concentration of 0.5 g/100 ml as determined at 25° C.

Molded objects and films may be prepared from the polyester compositions of the invention including any preferred embodiment.

Also, a method for decreasing the glass transition temperature and the melt viscosity of the copolyesters of the polyester composition of the invention is desirable using the polyalkylene ethers of the invention. In this method, all preferred embodiments of the polyester composition of the invention are also desirable.

The following abbreviations are used herein: $T_g$ refers to the glass transition temperature; DSC refers to Differential Scanning Calorimetry.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated. Percentages as referred to herein are percentages by weight unless otherwise specified.

EXAMPLES

All of the following examples were prepared using poly (1,4-cyclohexanedimethylene terephthalate) (PCT) having an inherent viscosity in the range of 0.65 to 0.75 dL/g as determined at 25° C. using 0.5 gram of polymer per 100 mL of a solvent composed of 60 wt % phenol and 40 wt % tetrachloroethane. The abbreviations "PCT", in these Examples refers only to poly(1,4-cyclohexanedimethylene terephthalate).

The polyalkylene ethers used were hydroxyl functional polyethylene glycol endcapped with ethyl hexanoate or reacted so that the ends of the polyethylene glycol are ethyl hexanoate esters (Plasticizer A) and polytetramethylene glycol (PTMG) (Plasticizer B). Benzoflex 312 (neopentylglycoldibenzoate), a common plasticizer for polyesters, was included as a control.

The compositions were prepared by mixing the desired components on a twin screw extruder with set temperatures of 300° C., extruded into a cold water bath and pelletized. All compositions are reported on a weight percent basis with the exception of the plasticizer concentration which is reported on a weight percent basis relative only to the matrix resin. The thermal analysis (DSC) and melt viscosity measurements were performed on the compounded pellets.

The effectiveness of the plasticizer on increasing the crystallization rate as well as lowering the optimum temperature for crystallization was determined by the evaluation of the temperature of crystallization on heating (Tch) by DSC with a scan rate of 20° C. per minute after quenching from the melt. An effective plasticizer will lower the Tch. Therefore, the lower the Tch value, the better the plasticizing effect. Melt viscosity was measured on a capillary rheometer (Gottferd rheometer) at the specified frequency and temperature.

Mechanical properties were evaluated on injection molded specimens following ASTM methods as follows: Tensile Strength and Tensile Elongation to Break were determined by ASTM Method D638; Notched Izod was determined by ASTM Method D256; Flexural Strength, Modulus and Strain to Break were determined by ASTM Method D790; and Heat Deflection Temperature was measured at 264 psi using ASTM Method D648.

Comparative Example 1 shows poly(1,4-cyclohexanedimethylene terephthalate) (PCT) compounded with glass, but no plasticizer was added. The glass transition temperature is 89° C. and the Tch is 133° C. as reported in Table 1. This Tch is >110° C. indicating that it should not be molded with a water-heated mold. In Table 2 the melt viscosity of example 1 is reported as 299 Pa*s. Comparative Example 2 shows PCT and glass compounded with 7.5 wt % of the commercial plasticizer Benzoflex 312. The glass transition temperature is depressed to 72° C., Tch decreases to 114° C. and the melt viscosity is lowered to 212 Pa*s. All three measurements indicate that Benzoflex 312 is indeed an effective plasticizer for PCT. Examples of the Invention, Examples 3–6 show PCT and glass compounded with polyalkylene ethers. Example 3 shows Plasticizer A at 7.5% which lowers Tg and Tch to 56° C. and 95° C., respectively. The melt viscosity of Example 3 is also lowered to 237 Pa*s compared to 299 Pa*s for the unplasticized PCT. This indicates that at the same level, Plasticizer A (polyethylene glycol end-capped with ethyl hexoate) is a more effective plasticizer than Benzoflex 312 when considering crystallization kinetics and is still effective at reducing melt viscosity.

Example 5 shows PCT and glass compounded with 7.5 wt % polytetramethylene glycol (PTMG). PTMG depresses the Tg to 64° C. the Tch to 100° C. and the melt viscosity to 196 Pa*s. PTMG, when used at equivalent levels as Benzoflex 312, is a superior plasticizer in terms of both crystallization kinetics and melt viscosity. The polyalkylene ethers are effective plasticizers and did not degrade the mechanical properties of the molded composites as reported in Table 3.

This shows that the polyalkylene ethers are better plasticizers for PCT than some of the conventional plasticizers in spite of the high processing temperature required to melt PCT.

TABLE 2

Melt Viscosity of 30% Glass Reinforced PCT

| Example | Plasticizer | Weight % Plasticizer | Melt Viscosity (Pa*s)* |
|---|---|---|---|
| 1 | None | — | 299 |
| 2 | Benzoflex 312 | 7.5 | 212 |
| 3 | Plasticizer A | 7.5 | 237 |
| 4 | PTMG | 7.5 | 196 |

*Measured at 305° C., with a shear rate of 400 sec.$^{-1}$ and reported in Pa*s

TABLE 3

Mechanical Properties of 30% Glass Reinforced PCT

| | EXAMPLE 2 | EXAMPLE 3 | EXAMPLE 2b | Example 5 |
|---|---|---|---|---|
| Tensile strength (MPa) | 130.0 ± 5 | 125.5 ± 5 | 118.5 ± 5 | 108.0 ± 5 |
| Tensile Elongation to Break (%) | 1.8 ± 0.2 | 1.9 ± 0.2 | 1.6 ± 0.2 | 1.7 ± 0.2 |
| Notched Izod @ 23° C. (Joules/meter) | 64.0 ± 5 | 69.0 ± 5 | 96.0 ±5 | 96.0 ± 5 |
| Flex Strength (MPa) | 189.0 ± 5 | 179.0 ± 5 | 155.0 ± 5 | 146.0 ± 5 |
| Flex Modulus (MPa) | 9,310 ± 600 | 8,760 ± 600 | 8,070 ± 600 | 7,170 ± 600 |
| Flex Strain to Break (%) | 2.3 ± 0.2 | 2.3 ± 0.2 | 2.1 ± 0.2 | 2.3 ± 0.2 |
| HDT @ 1.8 MPa (° C.) | 249 ± 5 | 251 ± 5 | 262 ± 5 | 270 ± 5 |

In Table 3, Examples 2 and 3 are comparable formulations and Examples 2b and 5 are comparable. Example 2b is identical to example 1, except no flame retardant was added. The addition of flame retardant alters the mechanical properties, thus 2 and 5 are not comparable.

Table 4 reflects data which compares the stability of Plasticizer A (PEG) to a blend of PCT and Plasticizer A. The value of "1% weight loss in air" is measured by dynamic thermogravimetric analysis (TGA) at 20° C. increase in temperature per minute. The value of "% weight loss at 300° C. for 30 minutes" is measured by isothermal TGA. One would expect that the Plasticizer A by itself would be as stable or more stable than the Plasticizer A blended with the PCT. However, this data shows that the blend of PCT and Plasticizer A is more stable than Plasticizer A alone.

TABLE 1

Thermal Analysis of 30% Glass Reinforced PCT

| Example | Plasticizer | Weight % Plasticizer | Tg (° C.) | Tch (° C.) | TM (° C.) |
|---|---|---|---|---|---|
| 1 | None | — | 89 | 133 | 291 |
| 2 | Benzoflex 312 | 7.5 | 72 | 114 | 289 |
| 3 | Plasticizer A | 7.5 | 56 | 95 | 282 |
| 4 | Plasticizer A | 3.75 | 77.5 | 121 | 290 |
| 5 | PTMG | 7.5 | 64 | 100 | 290 |
| 6 | PTMG | 5.0 | 75.5 | 116 | 289 |

TABLE 4

COMPARISONS OF THERMAL STABILITY

| | 1 % Wt loss (air) ° C. | 10 % Wt loss (air) ° C. | % Wt loss at 300° C. air 30 min |
|---|---|---|---|
| Plasticizer A | 123.0 | 205.3 | 100.0 |
| Plasticizer A + 0.25% Irganox 1010* | 130.0 | 220.1 | 100.0 |
| Plasticizer A + 0.5% Irganox 1010* | 129.0 | 227.5 | 97.0 |
| Plasticizer A + 1.0% Irganox 1010* | 132.0 | 234.9 | 95.0 |
| PCT + 3.75% Plasticizer A | 318.0 | 392.9 | 2.7 |
| PCT Control | 362.0 | 398.2 | 1.2 |

Irganox 1010 is an additive which is a hindered phenol.

The invention has been described in detail with particular reference to preferred embodiments thereof, but it will be understood that variations and modifications can be effected within the spirit and scope of the invention. Moreover, all patents, patent applications (published and unpublished, foreign or domestic), literature references or other publications noted above are incorporated herein by reference for any disclosure pertinent to the practice of this invention.

We claim:

1. A polyester composition comprising a blend of:
    (A) 97.0 to 75.0 weight % of a copolyester having an inherent viscosity of 0.1 to 1.2 dL/g and having a melting point in excess of 250° C., comprising:
        (1) one or more dicarboxylic acids, and
        (2) a glycol component comprising at least 80 mole % 1,4-cyclohexanedimethanol; and (B) 3.0 to 25.0 weight % of one or more polyalkylene ethers, wherein the molecular weight of the polyalkylene ether is from 200 to 1500 and the polyalkylene ether comprises a compound of the formula:

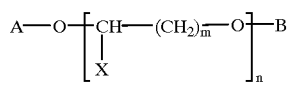

wherein,
 m is an integer from 1 to 3, inclusive,
 n is an integer from 4 to 25, inclusive,
 X is selected from one or more of the group consisting of CH$_3$, C$_3$H$_7$, C$_2$H$_5$, and H,
 A is hydrogen, alkyl, acyl, or aryl of 1 to 10 carbon atoms, and
 B is hydrogen, alkyl, acyl, or aryl of 1 to 10 carbon atoms;
and wherein the weight percentages of all components in the blend total 100 weight %.

2. The polyester composition of claim 1 wherein said one or more dicarboxylic acids comprise at least 90 mole % terephthalic acid.

3. The polyester composition of claim 1 wherein said copolyester is present in an amount of 97.0 to 85 weight %.

4. The polyester composition of claim 3 wherein said copolyester is present in an amount of 97.0 to 90 weight %.

5. The polyester composition of claim 4 wherein said copolyester is present in an amount of 97 to 93 weight %.

6. The polyester composition of claim 2 wherein said acid component comprises repeat units of from 10 mole % or less of one or more other dicarboxylic acids.

7. The polyester composition of claim 1 wherein said dicarboxylic acids are selected from the group consisting of terephthalic acid, cyclohexanedicarboxylic acid, isophthalic acid, 1,4-cyclohexanediacetic acid, diphenyl-4,4'-dicarboxylic acid, succinic acid, glutaric acid, adipic acid, azelaic acid, naphthalenedicarboxylic acid, and sebacic acid.

8. The polyester composition of claim 7 wherein said acid component comprises isophthalic acid.

9. The polyester composition of claim 7 wherein said acid component comprises 1,4-cyclohexanedicarboxylic acid.

10. The polyester composition of claim 7 wherein said acid component comprises naphthalenedicarboxylic acid.

11. The polyester composition of claim 2 wherein said other dicarboxylic acids are selected from the group consisting of isophthalic acid, cyclohexanedicarboxylic acid, 1,4-cyclohexanediacetic acid, diphenyl-4,4'-dicarboxylic acid, succinic acid, glutaric acid, adipic acid, azelaic acid, naphthalenedicarboxylic acid, and sebacic acid.

12. The polyester composition of claim 1 wherein said glycol component comprises 95 to 100 mole % 1,4-cyclohexanedimethanol.

13. The polyester composition of claim 1 wherein said glycol component comprises up to 20 mole % of one or more other aliphatic or alicyclic glycols.

14. The polyester composition of claim 13 wherein said glycol component comprises up to 10 mole % of one or more other aliphatic or alicyclic glycols.

15. The polyester composition of claim 14 wherein said one or more other glycols is selected from the group consisting of ethylene glycol, diethylene glycol, triethylene glycol, propanediol, butanediol, pentanediol, hexanediol, and tetramethylcyclobutanediol.

16. The polyester composition of claim 15 wherein said one or more other glycols comprises ethylene glycol.

17. The polyester composition of claim 1 wherein said polyalkylene ethers comprise polyethylene glycol, polytetramethylene glycol, and polypropylene glycol.

18. The polyester composition of claim 1 wherein said polyalkylene ether is poly(ethylene glycol).

19. The polyester composition of claim 1 wherein said polyalkylene ether is polytetramethylene glycol.

20. The polyester composition of claim 1 wherein said polyalkylene ethers have a number average molecular weight of 400 to 1,500.

21. The polyester composition of claim 1 further comprising one or more additives.

22. The polyester composition of claim 21 wherein said additives are present at 0.1 to about 20 weight % based on the total weight of said polyester composition.

23. The polyester composition of claim 21 wherein said additives are selected from the group consisting of stabilizers, flame retardants, tougheners, epoxy compounds, mold release agents, nucleating agents, and colorants.

24. The polyester composition of claim 1 comprising one or more reinforcing agents.

25. The polyester composition of claim 24 wherein said one or more reinforcing agents comprise glass fibers.

26. The polyester composition of claim 25 wherein said glass fibers are present in said polyester composition at from 0.1 to 40% by weight based on the total weight of said polyester composition.

27. The polyester composition of claim 21 wherein said additives comprise flame retardants.

28. A molded object prepared from the composition of claim 1.

29. The polyester of claim 1, wherein n is an integer of from 4 to 14.

30. The polyester of claim 1, wherein n is an integer of from 7 to 25.

31. A method for decreasing the glass transition temperature and the melt viscosity of a polyester composition comprising a copolyester having an inherent viscosity of 0.1 to 1.2 dL/g and having a melting point in excess of 250° C., the copolyester comprising:
 (a) one or more dicarboxylic acids, and
 (b) a glycol component comprising at least 80 mole % 1,4-cyclohexanedimethanol;
wherein the method comprises the step of adding to the polyester composition 3.0 to 25.0 weight % of one or more polyalkylene ethers, wherein the molecular weight of the polyalkylene ether is from 200 to 1500, and the polyalkylene ether comprises a compound of the formula:

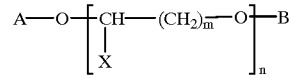

wherein,
 m is an integer from 1 to 3, inclusive,
 n is an integer from 4 to 25, inclusive,
 X is selected from one or more of the group consisting of CH$_3$, C$_3$H$_7$, C$_2$H$_5$, and H,
 A is hydrogen, alkyl, acyl, or aryl of 1 to 10 carbon atoms, and
 B is hydrogen, alkyl, acyl, or aryl of 1 to 10 carbon atoms;
and wherein the weight percentages of the copolyester and the one or more polyalkylene ethers total 100 weight %.

32. A polyester composition consisting essentially of a blend of:
 (A) 97.0 to 75.0 weight % of a copolyester having an inherent viscosity of 0.1 to 1.2 dL/g and having a melting point in excess of 250° C., comprising:

(1) one or more dicarboxylic acids,
(2) a glycol component comprising at least 80 mole % 1,4-cyclohexanedimethanol; and (B) 3.0 to 25.0 weight % of one or more polyalkylene ethers, wherein the molecular weight of said polyalkylene ether is from 200 to 1500 and the polyalkylene ether comprises a compound of the formula:

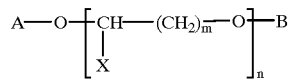

wherein, m is an integer from 1 to 3, inclusive, n is an integer from 4 to 25, inclusive, X is selected from one or more of the group consisting of $CH_3$, $C_3H_7$, $C_2H_5$, and H, A is hydrogen, alkyl, acyl, or aryl of 1 to 10 carbon atoms, and B is hydrogen, alkyl, acyl, or aryl of 1 to 10 carbon atoms;

and wherein the weight percentages of all components in the blend total 100 weight %.

* * * * *